United States Patent [19]

McCarthy

[11] Patent Number: 5,788,435
[45] Date of Patent: Aug. 4, 1998

[54] AUTOMATED DIAMOND CUTTER APPARATUS

[76] Inventor: John F. McCarthy, 307-14 Amherst St., Nashua, N.H. 03063

[21] Appl. No.: 430,715

[22] Filed: Apr. 28, 1995

[51] Int. Cl.[6] .................... B23C 9/00; B23Q 15/00
[52] U.S. Cl. .................. 409/187; 318/572; 451/155; 409/194
[58] Field of Search .................. 409/94, 80, 157, 409/186, 87, 188, 194, 195, 79; 408/11; 318/572, 568.1; 82/1.11; 364/552, 474.16; 451/155, 27; 73/862.333, 862.321

[56] References Cited

U.S. PATENT DOCUMENTS

| | | | |
|---|---|---|---|
| 3,672,101 | 6/1972 | Grossen | 451/155 X |
| 3,728,595 | 4/1973 | Adams | 409/94 |
| 3,741,071 | 6/1973 | Hoglund | 409/195 |
| 3,841,199 | 10/1974 | Jepson et al. | 419/80 |
| 3,857,025 | 12/1974 | English et al. | 409/80 X |
| 4,000,448 | 12/1976 | Shum | 318/572 X |
| 4,031,368 | 6/1977 | Colding et al. | 82/1.11 X |
| 4,073,247 | 2/1978 | Cunningham et al. . | |
| 4,428,055 | 1/1984 | Zurbrick et al. | 408/11 X |
| 4,451,187 | 5/1984 | Ishikawa et al. | 409/187 |
| 4,532,599 | 7/1985 | Smith | 364/552 |
| 4,656,868 | 4/1987 | Azuma et al. | 409/194 |
| 4,772,161 | 9/1988 | Nagao et al. | 409/187 |
| 4,786,219 | 11/1988 | Oberlin et al. . | |
| 4,868,961 | 9/1989 | Coleman et al. . | |
| 4,944,643 | 7/1990 | Lehmkuhl | 409/80 |
| 4,972,323 | 11/1990 | Cauwet . | |
| 5,105,135 | 4/1992 | Nashiki | 318/568.1 |
| 5,116,174 | 5/1992 | Fried et al. | 409/79 |
| 5,139,373 | 8/1992 | Logan et al. | 409/80 |
| 5,387,061 | 2/1995 | Barkman et al. | 409/80 |

FOREIGN PATENT DOCUMENTS 791503  12/1980  U.S.S.R. .................. 409/194

*Primary Examiner*—William R. Briggs
*Attorney, Agent, or Firm*—Watson Cole Stevens Davis P.L.L.C.

[57] ABSTRACT

First and second motors are provided for moving a workpiece support in an up and down direction and and for rotation about an axis. Third, fourth and fifth motors are provided for moving a rotating cutter in a lateral direction, for rotating the cutter about an axis, and for moving the cutter toward and away from a workpiece. A first conductive pin sensor senses workpiece parameters. A cutter motor rotates the cutter at constant speed, and a second sensor senses changes in cutter motor torque when the cutter comes into contact with a workpiece. A computer includes a memory for storing instructions for cutting a desired pattern, and the computer causes the first, second, third, fourth and fifth motors to vary the relative position of the cutter and workpiece support to cut a pattern in the workpiece.

19 Claims, 6 Drawing Sheets

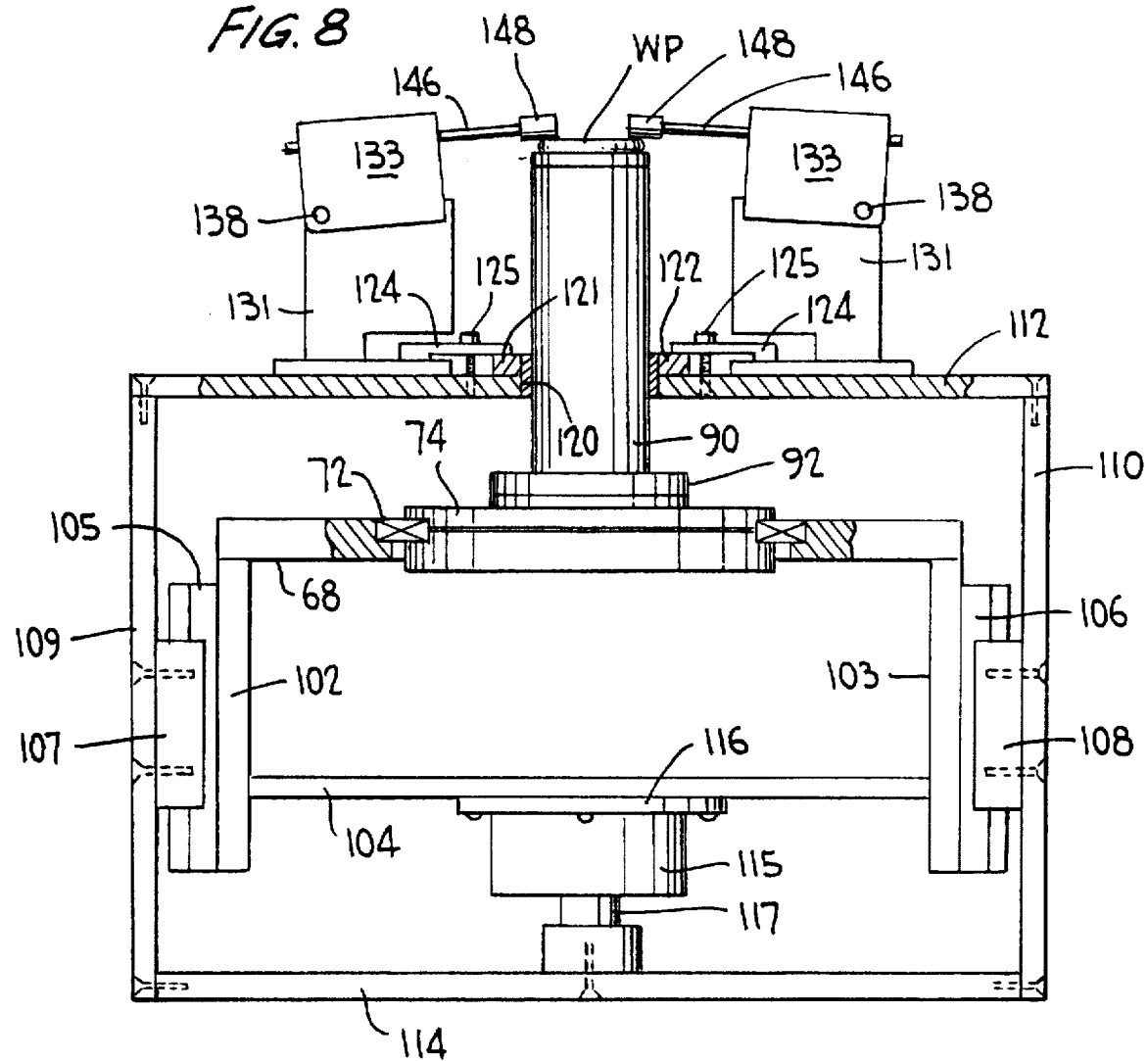

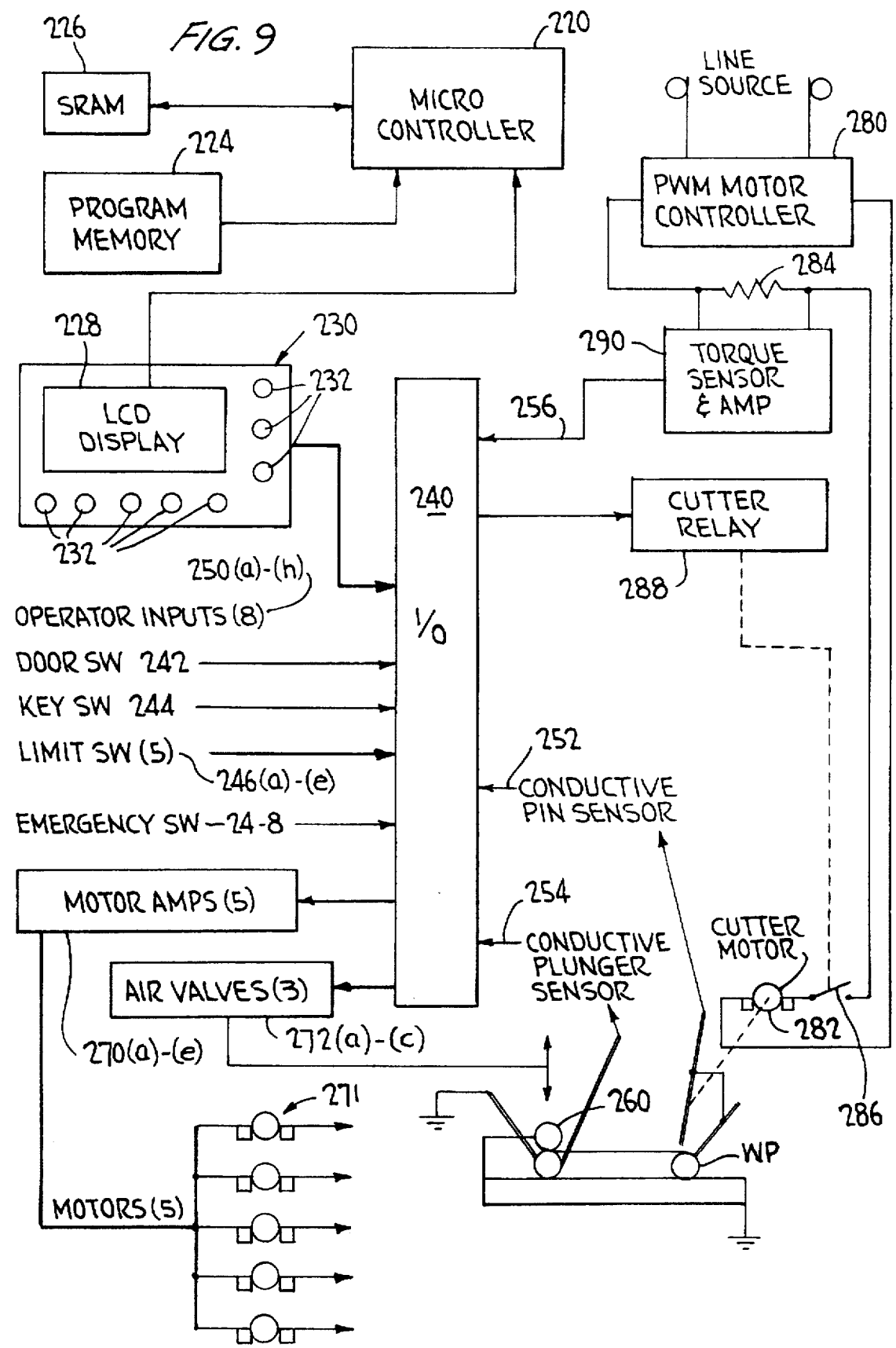

AUTOMATED DIAMOND CUTTER APPARATUS

BACKGROUND OF THE INVENTION

The present invention relates to automated diamond cutter apparatus which is adapted to cut materials which may be very thin, and which is especially useful for cutting thin-walled jewelry. The jewelry may be formed of different materials such as gold, silver, pewter and the like. The invention is specifically described in connection with the cutting of tubular earrings, but it should be understood that the invention may also be used in cutting other jewelry of different shapes or other thin walled articles such as stampings.

The cutter apparatus employs a diamond tip which is adapted to cut various patterns into the jewelry in order to improve its appearance under different lighting conditions. The facets of the pattern reflect light in many directions to give a piece of jewelry a much brighter appearance than a smooth finish thereby providing a more attractive product.

The art of diamond cutting in the prior art has been performed entirely by hand. The diamond cutting is the most labor intensive and most expensive part of the earring manufacturing process. Workers use a flexible shaft rotary tool with a diamond cutter flywheel. The flexible shaft tool is used to relieve the operator from holding the weight of the motor in his arms. The motor turns the flywheel between 30,000 and 40,000 revolutions per minute. The diamond cutter flywheel includes a small diamond which is cut to the correct angle to make a cut. Only one cutter is provided at the end of the tool, but a smooth cut is obtained since the flywheel is spinning very fast.

While holding the earring in one hand, the other hand holds the tool to maneuver it into contact with a piece of jewelry. Each cut is done one at a time. Usually a few cuts are made before the operator has to shift the position of the jewelry in his hand. In a typical hoop earring, there are often over 250 cuts per hoop. This can easily take 6 to 8 minutes per ring for an operator to complete. Accordingly, it is expensive to perform such cutting by hand.

Furthermore, manual cutting can lead to some serious quality problems. Hoops made of gold tubing may have a wall thickness of as little as 0.003 inch. Cuts can be successfully made since the operator can physically sense when the tool hits the gold surface and then can adjust the cutting force accordingly. Quite a bit of skill is required to make a cut that must be at least 0.002 inch deep, but which cannot be 0.003 inch deep since the operator will cut all the way through the wall thereby resulting in a ruined item. In addition, the cuts must be made in exacting locations on the jewelry and at a relatively fast pace. The mental concentration required to produce acceptable products leads to rapid employee burnout in the industry.

Hoop earrings present special problems in making a quality product. These earrings are made by cutting loops off the end of a long coil of helically wound precision tubing formed of suitable material such as gold. Since the tubing is so thin, the manufacturing process adds a great deal of variation to the dimensions of the earring. These variations are not so important when a person is performing the cutting operation, but if a machine is to automatically do the cutting, the dimensional variations must be taken into account in order to produce a quality finished product.

The helix in each hoop varies by a great deal, the helix being caused by the fact that the rings are cut off the end of a helically would coil. Most groups of hoops from the same batch are off by as much as 0.040 inch. The hoops are often of different length thereby causing the gap in the hoop to be of varying length. The hardware soldered to the ends of the hoop can also affect final dimensions of the hoops.

SUMMARY OF THE INVENTION

The invention provides a semi-automatic apparatus that performs most of the accurate and time consuming work that is currently done by hand. An operator initially places a workpiece on the support means of the invention, whereupon the apparatus automatically makes the cuts in the workpiece in accordance with a selected design which is present in the memory of the computer of the apparatus. The operator then manually turns the workpiece over when necessary, and then finally removes the finished article from the apparatus. Accordingly, the cutting steps performed by hand in the prior art are carried out automatically by the invention apparatus.

The invention can be used for making cuts in tubular earrings, or in spherical earrings as well as jewelry of other configurations. A quality finished product is provided even though the workpieces which are cut may have widely varying dimensions from one workpiece to another.

A support means is provided for supporting a workpiece at the upper end thereof. A first motor is provided for moving the support means in an and down directions, and a second motor is provided for rotating the support means in opposite directions. A carriage is supported within a housing for linear movement in a lateral direction. A third motor is provided for moving the carriage back and forth. A rotatable member is rotatably carried by the carriage for rotation about an axis. A fourth motor is provided for rotating the rotatable member in opposite directions about its axis of rotation.

A cutter slide is carried for linear movement by the rotatable member. A fifth motor is provided for moving the cutter slide back and forth in a linear direction. The cutter means is mounted on the cutter slide, the cutter means being positioned such that when it moves toward the workpiece, the cutter means moves along a path perpendicular to the surface of the workpiece at the exact point which is to be cut. Cuts may be made at up to 180 cuts per minute under ideal conditions. Operation of the fifth motor moves the cutter means into and out of cutting engagement with the workpiece.

The support means is carried by a primary table for rotation with respect thereto, and the first motor moves the primary table up and down to adjust the position of the support means. The second motor is drivingly connected to the support means for rotating the support means with respect to the primary table. A secondary table carried hold down means for holding a workpiece in operative position on the support means. The secondary table is supported by the primary table and is vertically movable with respect to the primary table to move the hold down means into or out of engagement with the workpiece.

The apparatus may include a sensor in the form of a pair of conductive plungers which engage a workpiece to provide a signal to a computer that a workpiece is in place on the support means. However, these plungers may be eliminated in the case where the support means is in the form of a mandrel upon which a tubular workpiece is supported.

The apparatus includes a first sensor in the form of a conductive pin which is supported adjacent to the cutter means and extends therebelow so that the pin is adapted to engage a workpiece before the cutter means does so that certain parameters such as the diameter and height of the workpiece above the support means can be sensed and the information stored in the associated computer.

The apparatus also includes a second sensor in the form of a torque sensing electrical circuit which senses changes in the torque of the cutter motor which drives the cutter means. This enables the apparatus to sense when the cutter means comes into frictional contact with the workpiece so that the computer can calculate whether the cutter means needs to move toward or away from the workpiece.

A control system for controlling operation of the apparatus includes a computer including a microcontroller and a program memory for storing a program for cutting a particular design in a workpiece. The computer also includes a static random access memory for storing information regarding certain parameters of a workpiece as sensed by the conductive pin sensor. Eight button switches are provided for controlling all of the functions of the apparatus. These buttons enable menus to appear on an LCD display and may be used, for example, to select a pattern, adjust all cuts to make small dimensional adjustments, change the cutter means, change the support means or to move the secondary table up and down.

The computer controls the operation of the five aforementioned motors so as to properly position the cutter means and move the cutter means into and out of cutting engagement with the workpiece. All of the code for the apparatus is written in assembly language. There are subroutines in the code that send out pulses to a plurality of driver amplifiers which operate the five motors. The amount of distance traveled per pulse of the linear drive motors depends on the lead of the lead screw. The first and third motors move the primary table and the carriage at a resolution of 3,200 pulses per inch. The fifth motor moves the cutter slide at a resolution of 6,400 pulses per inch.

The control system also includes various switch inputs to the computer including a door switch which must be activated before the control system is operative. A key switch prevents tampering with certain functions of the apparatus. Five limit switches are provided, one limit switch being operatively associated with each of the motors and the components connected thereto so that a "home" position can be established for these components.

A switch output is provided from the computer to open a switch to turn off the cutter means drive motor. The computer also operates various air valves for controlling the operation of a door lock, the conductive plungers and movement of the secondary table relative to the primary table for operating the hold down means.

BRIEF DESCRIPTION OF THE DRAWINGS

FIG. 8 is a view looking to the left along line 8—8 of FIG. 5 with the carriage means and the components supported thereby removed for clarity; and FIG. 9 is a schematic block diagram of a control system for controlling the operation of the apparatus.

DESCRIPTION OF THE PREFERRED EMBODIMENT

Figure 2:
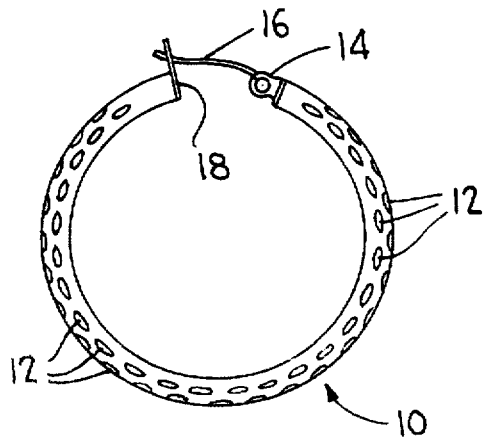
FIG. 2 is a top view of a hoop earring having a pattern formed around therein and extending around the hoop.
Figure 3:
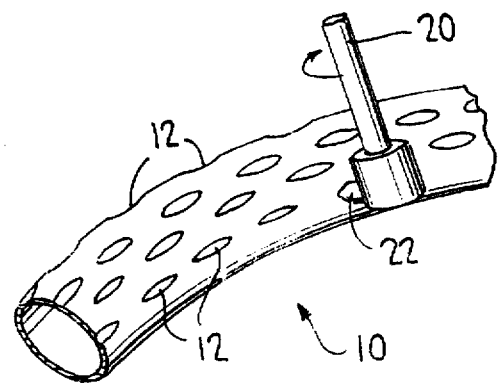
FIG. 3 is a perspective view showing a portion of the hoop with the cutter means in cutting position relative thereto.

Referring now to the drawings wherein like reference characters designate corresponding parts throughout the several views, there is shown in FIGS. 2 and 3 a hoop earring 10 having a pattern cut therein comprising a plurality of recesses 12 which as shown are formed in a plurality of rows extending around the earring. The earring comprises a thin-walled tubular member having opposite ends to which are secured a clasp. A conventional clasp includes a member 14 secured to one end of the tube and which pivotally supports an elongated member 16 which is snapped into place between a pair of upstanding arms formed on a member 18 secured to the opposite end of the tube. FIG. 3 illustrates a driven spindle 20 having a diamond cutter tip 22 connected to the outer end thereof, and indicates the manner in which the recesses are cut into the outer surface of the earring.

Figure 1:
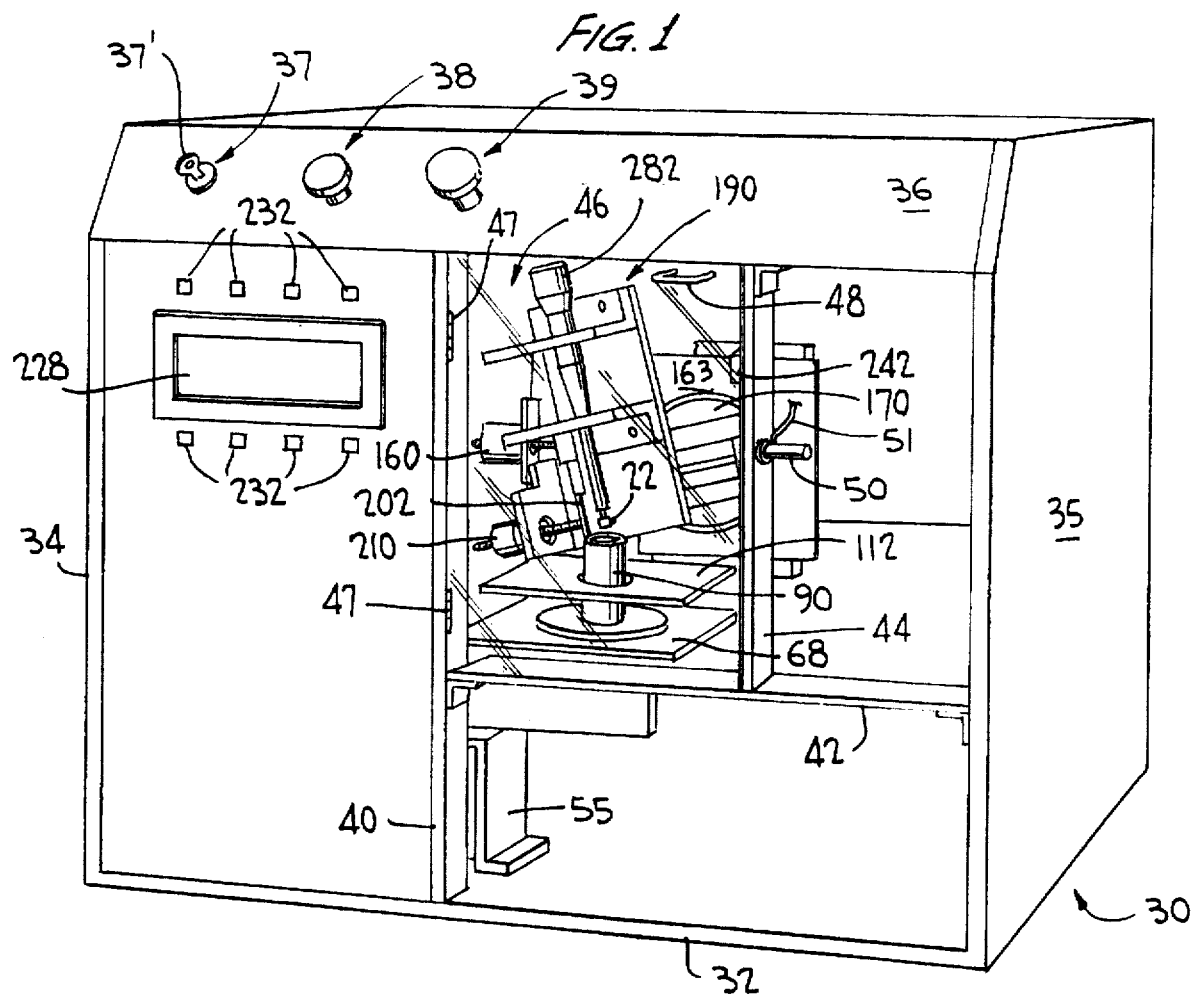
FIG. 1 is a perspective view of the housing of the invention with components supported within the housing.

FIG. 1 shows a housing for the apparatus, the housing as well as other components of the structure being formed of aluminum or the like rigid material. The housing includes a base 32 which is secured to side walls 34 and 35 which in turn are connected to an upper member 36 which supports three switches 37, 38 and 39. Switch 37 is a key switch which can be operated by a key 37'.

The key switch is used to lock out some of the adjustments which an operator can make when using the apparatus. This prevents unauthorized users from fiddling with patterns which could potentially cause damage. Switch 38 is the main power switch which must be closed in order to use the apparatus. Switch 39 is an emergency switch for quickly deactivating the apparatus if an emergency situation should arise.

A vertically extending frame member 40 extends between and is secured to the base 32 and the top of the housing. A horizontal frame member 42 extends between and is secured to frame member 40 and side wall 35. A vertically extending frame member 44 extends between and is secured to base member 42 and the top of the housing.

A transparent Plexiglas door 46 is hinged at 47 to frame member 40 and has a handle 48 connected thereto for manipulating the door. A door switch sensor 242 is activated when the door is closed to provide a signal to the computer of the control system hereinafter discussed, and the computer then sends a signal to close a door lock 50 which is air-operated through a tube 51.

Figure 5:
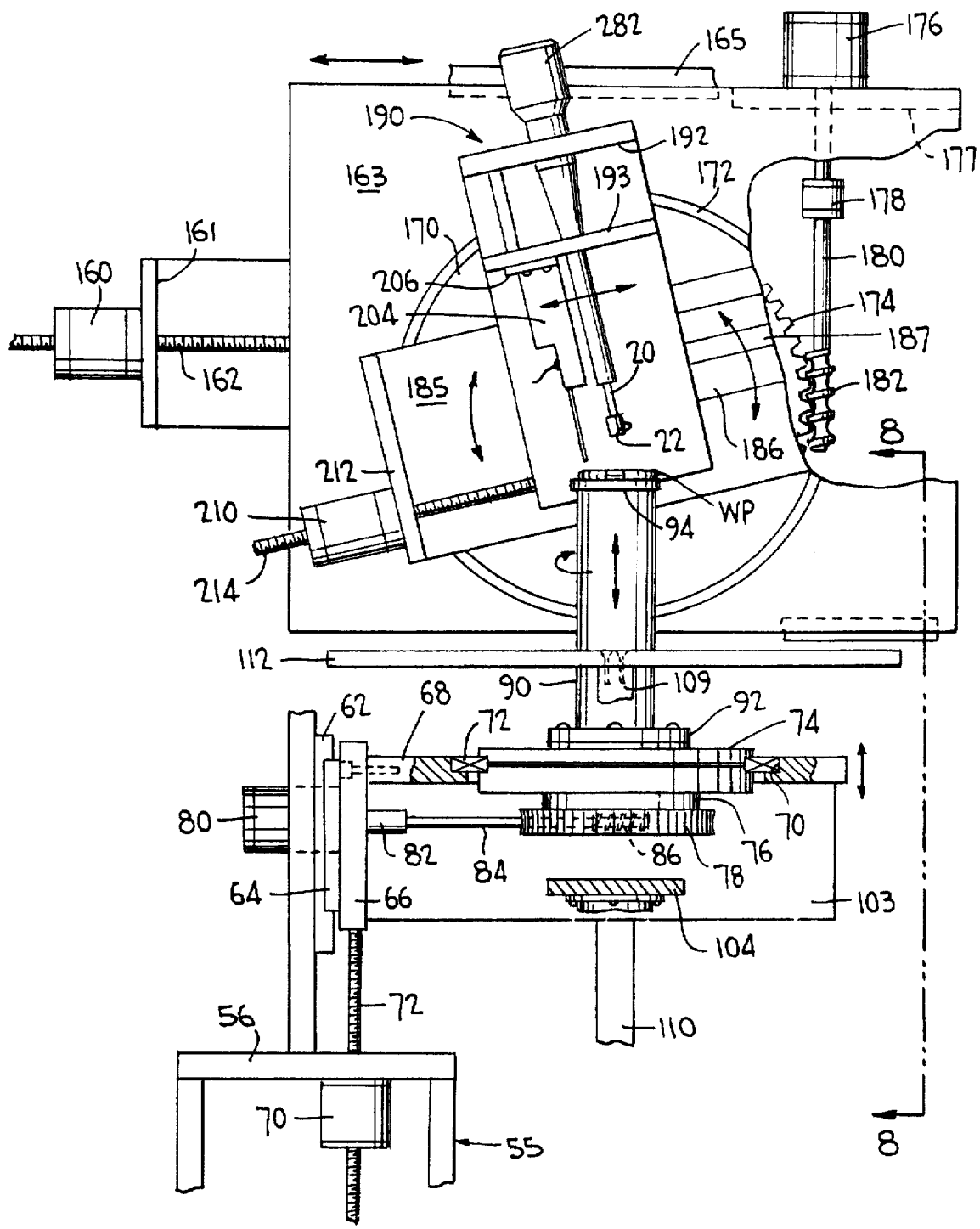
FIG. 5 is front view partly in section and with the hold down means removed for the sake of illustration showing the five positioning motors and the components associated therewith.

Referring to FIG. 5, a support 55 is fixed to base 32 of the housing and is generally of inverted U-shape to include a top member 56 which in turn supports a vertically extending plate 60. A guide member 62 is fixed to plate 60 and a conventional circulating ball slide 64 slidably engages guide member 62. The ball slide 64 is fixed to a plate 66 which in turn is fixed to an edge of a primary plate 68. A first motor 70 comprises a conventional hollow shaft stepper motor fixed to member 56 of support 55. Motor 70 has a lead screw 72 the upper end of which is attached to plate 66. Operation of the first motor is adapted to move plate 66 and the components supported thereby in up and down directions.

A central portion of primary plate 68 has a circular opening 70 formed therethrough which supports a bearing 72. A circular rotating table 74 is rotatably supported on bearing 72 and includes a depending portion 76 having a worm gear 78 secured to the lower end thereof. A second motor 80 is a conventional rotary stepper motor fixed to plate 66. Motor 80 is connected through a flexible coupling and shaft 84 with a worm 86 which is drivingly engaged with worm gear 78. Operation of the second motor is adapted to rotate table 74 about a vertical axis.

Figure 6:
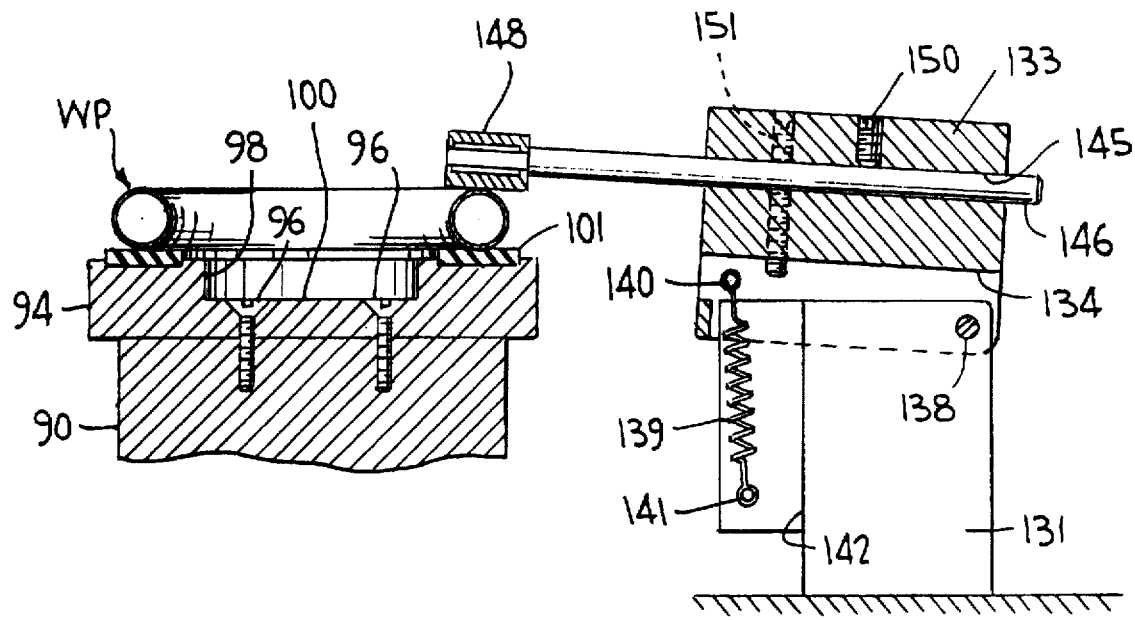
FIG. 6 is a sectional view taken on line 6—6 of FIG. 4.

A support means includes a cylindrical post 90 the lower end of which includes a flange 92 fixed to table 74. Referring to FIG. 6, the upper end of post 90 supports a cylindrical member 94 which is fixed to the post by bolts 96 extending through suitable holes formed through member 94 and are threaded into threaded holes formed in the top of member 90. The upper surface of member 94 is is provided with a central cavity 98 therein having a bottom surface 100. An annular resilient member 101 formed of rubber or the like is supported on the upper surface of member 94 for supporting the tubular workpiece WP and preventing movement of the workpiece relative thereto after the hold down rollers are engaged with the workpiece as hereinafter explained.

Referring to FIG. 8, primary plate 68 has a pair of depending plates 102 and 103 fixed to opposite sides thereof, plate 102 having been removed in FIG. 5 for the purpose of illustration. A cross piece 104 has the opposite ends thereof fixed to plates 102 and 103. Guide members 105 and 106 are fixed to plates 102 and 103 respectively. Guide members 105 and 106 are in sliding engagement with conventional circulating ball slides 107 and 108 respectively, slides 107 and 108 being fixed to bars 109 and 110 respectively.

The upper ends of bars 109 and 110 are fixed to opposite sides of a secondary table 112. The lower ends of bars 109 and 110 are fixed to the opposite ends of a cross member 114. An air operated device includes a cylinder 115 having a flange 116 which is fixed to cross piece 104, and the piston 117 of the device is fixed to cross member 114. It is apparent that operation of this air operated device will result in raising or lowering secondary plate 112 with respect to primary plate 68.

Figure 4:
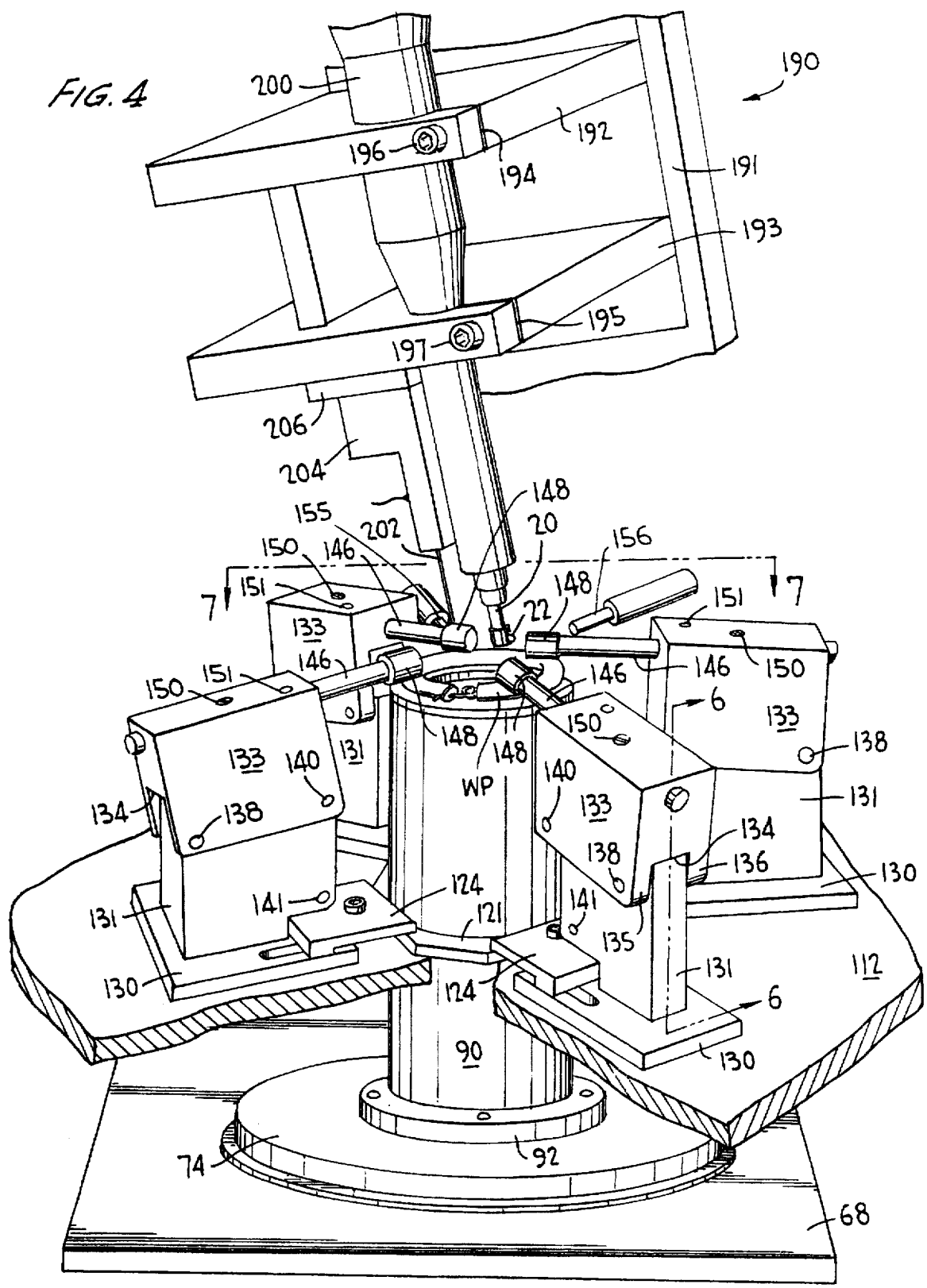
FIG. 4 is top perspective view showing a portion of the support means and the cutter means.

Referring to FIGS. 4 and 8, the central portion of plate 112 has a central opening 120 formed therethrough through which post 90 extends. An annular member 121 carries a felt seal 122 which engages the outer surface of the post. Four similar clamping members 124 are disposed at equally spaced points about the post, and bolts 125 extend through suitable holes formed in the clamping members, the bolts being threaded into threaded openings provided in secondary plate 112.

The inner end of the undersurface of each clamping member bears down on the upper surface of annular member 121, while the outer end of the undersurface of each clamping member bears down on the upper surface of a base portion 130 of one of four similar hold down support members each of which includes a central support block 131 fixed to the associated base portion.

Referring to FIGS. 4 and 6, each of the four hold down structures includes a block 133 having a cutout 134 formed in the lower surface thereof to define a pair of side walls 135 and 136 disposed on opposite sides of the associated block 131. Block 133 is pivotally supported on block 131 by a pin 138 extending through suitable holes formed in block 131 and walls 135 and 136. Block 133 is normally biased downwardly by a tension spring 139 having its opposite ends connected to a pin 140 extending through suitable holes formed in walls 135 and 136 and a pin 141 extending through opposite walls in the inner part of block 131 as defined by a cutout 142 formed in block 131.

A bore 145 is formed through each block 133 and rotatably supports a shaft 146 having a hold down roller 148 supported on the inner end thereof. It is apparent that when the rollers engage the workpiece at four equally spaced points therealong, the workpiece will be firmly held in place on the support means during operation of the apparatus. The shaft 146 may be adjusted longitudinally of the bore 145 to accommodate workpieces of different sizes, the shaft being held in adjusted position by a set screw 150 mounted within a threaded bore formed in block 133. A further limit stop set screw 151 is mounted within a threaded bore formed in block 133 and is offset with respect to bore 145. Set screw 151 limits downward movement of the hold down rollers 148 when the support means is lowered during operation of the apparatus.

Figure 7:
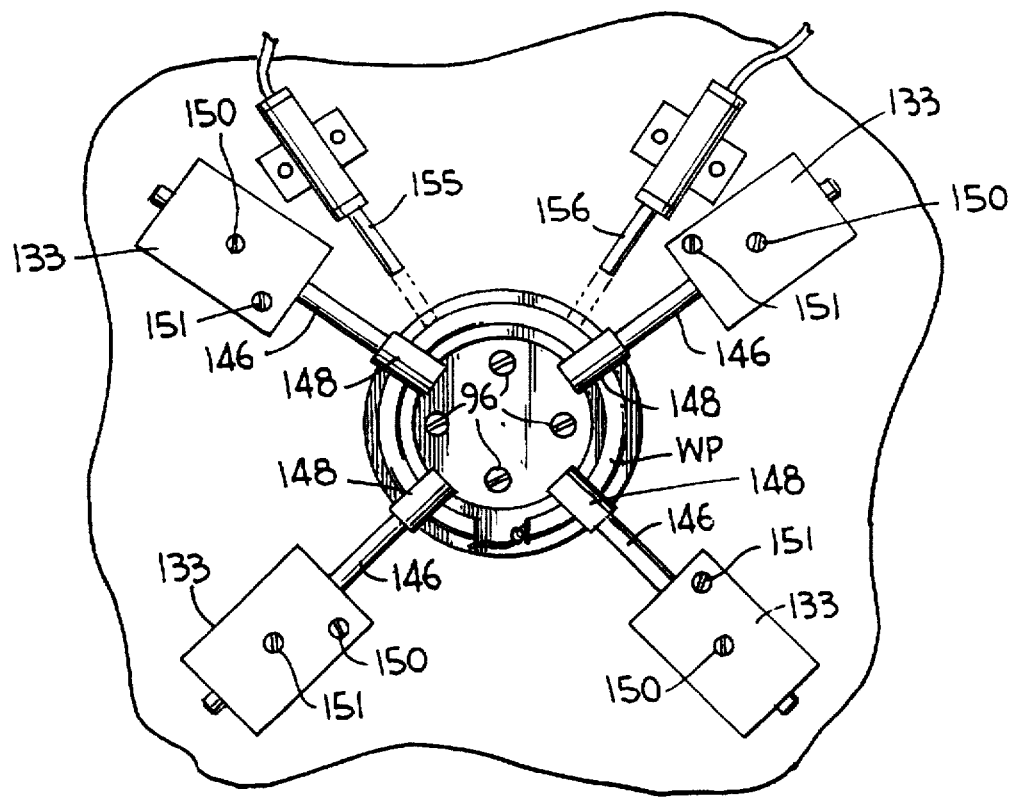
FIG. 7 is a view looking downwardly along line 7—7 of FIG. 4 with the cutter means and sensor means removed for clarity.

Referring to FIGS. 4 and 7, a pair of positioning plungers 155 and 156 are supported in position so that the inner ends of the plungers are adapted to engage a workpiece when the plungers are moved outwardly into the dotted line position shown in FIG. 7. The plungers are normally spring biased into a retracted position, and are urged outwardly when air pressure is applied to the plungers. A source of compressed air is provided, and an air valve controls flow of compressed air to the plungers. When a workpiece is initially placed on the support means, compressed air is provided to urge the plungers outwardly to engage the workpiece which is formed of an electrically conductive material. The plungers are connected in an electrical circuit such that when the plungers engage the workpiece, a signal is provided to the computer indicating that the workpiece is in place, whereupon the computer initiates the program controlled operation of the apparatus as explained in detail hereinafter.

Referring to FIG. 5, a third motor 160 which is a stepper motor similar to the first motor 70 is supported on a plate 161 mounted within the housing. The lead screw 162 of the third motor is connected to a carriage 163 which is in the form of a generally rectangular plate having the upper and lower edges thereof slidably supported within guides 165 and 166. Operation of motor 160 is adapted to cause the carriage to shift in opposite lateral directions as seen in FIG. 5.

The carriage is provided with a hole therethrough, and a rotatable member 170 is rotatably supported by a bearing 172 disposed within the hole. The rotatable member has a worm gear 174 formed thereon. A fourth motor 176 is a rotary stepper motor similar to motor 80 and is carried by a plate 177 fixed to carriage 163. The motor is drivingly connected through a flexible coupling 178 and shaft 180 with a worm 182. Operation of the fourth motor is adapted to rotate member 170 thereby rotating the angle of the spindle of the cutter means with respect to the workpiece.

A plate 185 is fixed to rotatable member 170 and has a recirculating ball slide 186 and a rail 187 fixed thereto for slidably supporting and guiding a cutter slide 190 which carries the cutter means. As seen in FIG. 4, the cutter slide 190 comprises a back plate 191 having fixed thereto a pair of spaced plates 192 and 193 which are split at 194 and 195 and have bolts 196 and 197 extending through suitable holes formed therein respectively for clamping in place a housing 200. The housing 200 supports a cutter motor 282 at the upper end thereof as seen in FIG. 5. The housing also supports the drive spindle 20 which extends from the lower end thereof, the diamond cutter 22 being disposed at the lower end of the spindle.

A sensor in the form of a conductive pin 202 is supported by a support structure 204 which is fixed to plate 193 through a block 206 of dielectric material so that the conductive pin is electrically insulated from the cutter slide structure. The conductive pin has a lower end which is disposed below the diamond cutter so that the conductive pin is adapted to engage the top of a workpiece before the cutter means when the cutter means is lowered with respect to the workpiece. The distance of the sensing pin to the cutter means is a known quantity which is stored in the memory of the computer hereinafter described.

A fifth motor 210 is fixed to a plate 212 which is in turn is fixed to and carried by member 185. The lead screw of the fifth motor is connected to the cutter slide 190. Operation of the fifth motor causes the cutter slide to move along rail 187 to move the cutter means into and out of engagement with the workpiece.

A limit switch is operatively associated with each motor and the component moved thereby. Such limit switches may be adapted to be activated either by movement of the motors or the components connected to the motors, and may comprise conventional infrared make and break beams to provide signals to the computer indicating suitable "home" positions for the associated components of the apparatus.

Referring to FIG. 9 of the drawings, a control system for controlling the operating of the apparatus is illustrated. The control system comprises a conventional microcontroller 220 which includes a suitable program memory 224 for controlling the operation of the apparatus to automatically cut a desired pattern in the workpiece; and a static random access memory (SRAM) 226 is provided for storing workpiece parameters. The control system also includes a display such as an LCD display 228 and an operator input panel 230 which includes eight operator input button switches 232. The program memory 224, the SRAM 226 and the LCD display 228 are coupled to the microcontroller 220 as illustrated.

The control system further includes an I/O device 240 coupled to the microcontroller as illustrated. The I/O device may be suitably coupled by an appropriate I/O bus (not shown) to a plurality of inputs and outputs. As is well-known in the art, the inputs and outputs may share a common I/O bus with a suitable decode logic device associated with the I/O device 240.

The inputs include a door switch input 242, a key switch input 244, five limit switches 246(a)–246(e), an emergency switch 248, eight operator inputs 250(a)–250(h), a conductive pin sensor input 252, a conductive plunger sensor input 254 and a torque signal input 256. The operation of the cutter means is prevented unless the door switch input 242 is enabled. The system will also go into an emergency shutdown mode if the emergency switch input 248 is activated.

The operator inputs 250(a)–250(h) are provided from the operator input switches 232 on the control panel to the I/O device as shown. Limit switch inputs 246(a)–246(e) are suitably coupled to limit switches associated with each of the stepping motors which vary the relative position of the cutter means and the support means. The limit switches provide suitable "home" indications to thereby provide a reference frame for initializing the system including the five stepper motors.

Conductive pin sensor input 254 is coupled to the conductive pin disposed adjacent to and extending below the cutter means. The workpiece is clamped in position by the hold down rollers indicated schematically at 260. When the conductive pin contacts the conductive workpiece WP, a circuit is established by a conductive path from the conductive pin, through the workpiece, the hold down rollers and to ground. The conductive pin sensor input 254 applies the signal to the microcontroller through the I/O 240 to provide a workpiece parameter which is stored in the SRAM.

The conductive plunger sensor input 254 is coupled to a circuit including the air operated plungers 155 and 156 which engage the workpiece as shown. These plungers may be activated to contact the workpiece and using the workpiece as a conductor form a circuit to check that the workpiece is in position on the support means. If the workpiece is in position, the air operated plungers form a completed circuit to ground as illustrated. The signal is coupled to the microcontroller via the I/O 240 in a manner similar to the arrangement for the conductive pin sensor. The input from the conductive plunger sensor provides an enable signal which allows the system to operate in accordance with the stored program. It should be understood that a suitable voltage source may be substituted for the grounded input signal arrangement herein described. In some cases, the conductive plunger sensor may be eliminated and other means may be employed to cause the system to operate.

The outputs include driver amplifier outputs 270(a)–270(e) which are connected to five driver amplifiers indicated at 271, the individual drive amplifiers each being suitably coupled to one of the stepper motors to control each motor in accordance with the program stored in the program memory. The outputs also include air valve outputs 272(a)–272(c) and cutter relay output 274. The three air valves are connected with a suitable source of compressed air and are connected to the air operated piston and cylinder which operates the secondary table up and down, the plungers of the conductive plunger sensor and the door lock respectively.

A conventional pulse width modulated motor controller 280 is coupled to an AC source as illustrated. The motor controller produces an output signal for driving the cutter motor 282 at a substantially constant speed. The cutter motor is drivingly connected with the cutter means. The output signal of the motor controller is coupled to the cutter motor via a lead including a current sensing resistor 284 and a switch 286 controlled by a cutter motor relay 288. The relay operates the switch to close the circuit between the motor controller and the cutter motor.

As the motor operates, the current signal through the resistor produces an output voltage $V_T$. A torque sensor and filter circuit 290 is coupled across the resistor and produces a suitably filtered torque signal $T_S$. The torque sensor and filter circuit may be one of a variety of known circuits which sense the voltage $V_T$ with the use of a differential amplifier circuit and a Schmidt trigger circuit (not shown). Since there are small changes in a small voltage, the changes correspond to changes in the motor torque resulting when the cutter means engages the workpiece which causes the cutter motor to tend to slow down due to the friction between the cutter means and the workpiece thereby affecting the motor current. If the voltage $V_T$ varies for a selected interval as determined by the torque sensor and filter circuit 290, an output signal $T_S$ is produced, for example, on a one shot circuit. The torque signal is then coupled to the microcontroller 12 through the torque signal input 256 and the I/O as illustrated. The torque signal $T_S$ is thus a highly precise indication that the cutter means has engaged the workpiece.

Since the SRAM has stored the workpiece parameters at various points on the workpiece, the microcontroller can determine in accordance with the program in the program memory whether or not the cut needs to be made deeper, and will provide output signals to the motor amplifiers which will cause the stepper motors to be operated as required to make the proper depth of cut at any particular location.

OPERATION

Operation of the invention is described hereinafter in connection with forming a suitable pattern to be cut into a hoop earring. It is understood that various patterns may be stored in the software of the computer. The steps set forth hereinafter may of course be varied according to the type of workpiece which is involved, and the steps set forth are only one example of the manner in which the apparatus may function. The steps are numbered for the sake of simplicity in describing the operation. It will be understood that in the following description, operation of the various motors and air cylinders is controlled by the computer in accordance with the program within the computer.

1. A pattern is selected using an appropriate button on the front panel of the machine.

2. A hoop workpiece is placed on the support with the gap in the hoop facing an operator, and a circuit is closed through the plungers which have been extended by the application of compressed air thereto. A signal is transmitted to the computer indicating that the workpiece is in place.

3. The air cylinder connected to the secondary table is operated causing the secondary table to be moved downwardly to clamp the hoop in place on the support, and the compressed air is cut off to the plungers so that the plungers retract.

4. The operator closes the door, causing the door switch to be operated to send a signal to the computer that the door is closed The computer then sends a signal to activate the door lock.

5. Motor #4 is operated to move the cutter spindle into a generally vertical position.

6. Motor #2 is operated to rotate the support about 90 degrees clockwise as seen looking down on the hoop so that the gap is to the left of the position shown in the drawings.

7. Motors #3 and #5 are operated to move the conductive pin sensor over the gap.

8. Motor is #1 is operated to move the support up.

9. Motor #2 is operated to rotate the support and hoop until the sensor pin hits the end of the hoop.

10. A signal is sent to the SRAM where the information is stored for future use.

11. Motor #1 is operated to lower the hoop.

12. Motor #3 is operated to move the pin to the left.

13. Motor #2 is operated to rotate the hoop farther in a clockwise direction.

14. Motor #1 is operated to raise the hoop.

DIAMETER READINGS PARAMETERS

15. Motor #5 is operated to move the sensor pin toward the hoop until it touches the surface.

16. A signal is sent to the SRAM where the information is stored for future use.

17. Motor #5 is operated to move the sensor pin away from the hoop.

18. Motor #2 is operated to rotate the hoop farther in a clockwise direction.

19. Steps 15–18 are repeated a number of times until a desired number of readings, such as six, are made about the outer periphery of the hoop with the information being stored in the SRAM thereby providing a number of readings of the diameter of the hoop along its periphery.

HEIGHT READING PARAMETERS

20. Motor #1 is operated to move the support and hoop downwardly.

22. Motor #1 is operated to move the support and hoop up until it hits the bottom of the pin.

23. A signal is sent to the SRAM where it is stored for future use.

24. Motor #1 is operated to move the support and hoop downwardly.

25. Motor #2 is operated to move the support and the hoop counterclockwise.

26. Motor #3 is operated to move the carriage to position the sensor pin over the center of the tubing of the workpiece in accordance with previously measured variations in the diameter of the hoop.

27. Steps 22–26 are repeated a number of times until a desired number of readings, such as six, are made along the hoop with the information being stored in the SRAM thereby providing a number of readings of the height of the hoop along its periphery.

28. The computer then interpolates intermediate positions between the measured points on the hoop for both diameter and height, which in a typical example may be at 250 points around the hoop.

CUTTING OPERATION

29. Motor #5 is operated to move the cutter means to the left about one-half inch to move the cutter means to the left of the workpiece.

30. Motor #4 is operated to tilt the spindle of the cutter means into cutting position.

31. Motor #1 is then operated to adjust the height of the workpiece.

32. Motor #3 is operated to adjust the carriage to be lined up with the center of the tubing of the workpiece based on earlier diameter calculations.

33. Motor #5 is operated to move the cutter means into engagement with the workpiece, whereupon the torque sensor provides a signal to the computer indicating that the cutter means has engaged the workpiece.

34. The computer then commands motor #5 to either move farther toward the workpiece or away from the workpiece depending on whether the cut need to be deeper or whether it is already deep enough.

35. After the computer determines that the cut is deep enough, it commands motor #5 to move the cutter means away from the workpiece.

36. Motor #2 is then operated to rotate the workpiece clockwise to the next position at which a cut is to be made.

37. Steps 31–35 are then repeated until one row of cuts has been made in the workpiece.

38. If additional rows of cuts are to be made, motor #4 is operated to change the angle of the spindle of the cutter means so that an additional row of cuts may be made in spaced relation to those of the first row.

39. Steps 33–36 are then repeated all the way around the hoop, but in the opposite or counterclockwise direction to complete the cuts on the outside of the workpiece. Steps 38 and 39 may need to be repeated depending on the number of rows of cuts which are to be made.

40. If it is desired to cut the inside of the workpiece, motor #1 is operated to move the workpiece downwardly.

41. Motor #3 is operated to move the cutter means to the right.

42. Motor #1 is operated to move the workpiece upwardly.

43. Then, cutting steps 30–39 are repeated until all the cuts have been made on the inside of the workpiece.

At this point all the cuts have been made on the upper half of the workpiece. If it is desired to make cuts in the lower half of the workpiece, the following steps occur.

44. The cutter means motor is turned off.

45. Motor #1 is operated to move the workpiece downwardly to clear the cutter means.

46. The secondary table is raised to release the hold down rollers.

47. An operator manually turns the workpiece over and places it back on the support means with the gap in the workpiece facing the operator.

48. Steps 3–10 are then repeated to sense and store the position of the end of the workpiece in a direction opposite to that of original steps 1–11.

49. Steps 15–28 are repeated to sense the diameter and height parameters of the workpiece since it is not in the same position on the support means.

50. Cutting steps 29–43 are repeated to cut the other half of the workpiece.

51. Steps 44–46 are then repeated, and the operator removes the finished workpiece.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

What is claimed is:

1. Automated diamond cutter apparatus comprising, support means, a first motor for moving said support means in an up and down direction, a second motor for rotating said support means about an axis, cutter means, a third motor for moving said cutter means in a lateral direction, a fourth motor for rotating said cutter means about an axis, a fifth motor for moving said cutter means toward and away from a workpiece supported on said support means, sensor means for sensing workpiece parameters and for sensing when the cutter means comes into contact with a workpiece, and a computer connected to said sensor means and said motor means, said computer including memory means for storing instructions for cutting a desired pattern and for storing workpiece parameters from said sensor means, said computer causing the motor means to vary the relative position of the cutter means and the support means so that the cutter means cuts the desired pattern in a workpiece.

2. Apparatus as defined in claim 1 wherein said sensor means includes a sensor pin mounted adjacent said cutter means for sensing the location of a workpiece relative to said support means.

3. Apparatus as defined in claim 1 wherein said support means includes resilient means at the top thereof to support a workpiece.

4. Apparatus as defined in claim 1 wherein said support means is carried by a primary table, said first motor being connected to said primary table, and said second motor being connected to said support means.

5. Apparatus as defined in claim 4 including a secondary table, means for raising and lowering said secondary table with respect to said primary table, and hold down means movably supported by said secondary table for engaging and holding a workpiece in place on said support means.

6. Apparatus as defined in claim 5 wherein said means for raising and lowering said secondary table includes a power operated cylinder and piston connected between said primary and secondary tables.

7. Apparatus as defined in claim 5 including resilient biasing means for moving said hold down means toward a workpiece, and limit stop means for limiting such movement.

8. Apparatus as defined in claim 5 wherein said hold down means is adjustably mounted for movement inwardly and outwardly toward the axis of rotation of said support means to accommodate workpieces of different sizes.

9. Apparatus as defined in claim 1 including a carriage movable in a lateral direction, said third motor being connected to said carriage, said cutter means being carried by said carriage.

10. Apparatus as defined in claim 9 including a rotatable member rotatably carried by said carriage, said fourth motor being connected to said rotatable member.

11. Apparatus as defined in claim 10 including a cutter slide carried by said rotatable member, said cutter means being carried by said cutter slide, and said fifth motor being connected to said cutter slide.

12. Automated diamond cutter apparatus comprising support means for supporting a workpiece, cutter means for cutting a workpiece, a plurality of motors for varying the relative positions of the cutter means and said support means, first conductive sensor means for engaging and sensing workpiece parameters, a driving motor connected to said cutter means, second sensor means for sensing when the cutter means comes into contact with a workpiece by sensing a change in torque of said driving motor, and a computer connected to said sensor means and said motor means, said computer including memory means for storing instructions for cutting a desired pattern and for storing workpiece parameters from said sensor means, said computer causing the motor means to vary the relative position of the cutter means and the support means so that the cutter means cuts the desired pattern in a workpiece.

13. Apparatus as defined in claim 12 including a further sensor means comprising a pair of plungers for engaging a conductive workpiece on the support, said plungers being connected in an electrical circuit including said computer to provide a signal to the computer when the plungers engage an electrically conductive workpiece.

14. Apparatus as defined in claim 12 wherein said first sensor means comprises a conductive pin disposed adjacent said cutter means for engaging a workpiece.

15. Apparatus as defined in claim 14 wherein said pin extends downwardly beyond said cutter means.

16. Apparatus as defined in claim 14 wherein said conductive pin is connected in an electrical circuit including a source of electrical potential and said computer to provide signals to the computer when the pin engages an electrically conductive workpiece.

17. Apparatus as defined in claim 12 including a motor controller for driving the driving motor as a substantially constant speed, said second sensor means sensing changes in current from said motor controller to said driving motor to provide signals to said computer.

18. Apparatus as defined in claim 17 wherein said second sensor means includes a resistor connected in series with said driving motor and said motor controller, said second sensor means measuring the voltage drop across said resistor.

19. Apparatus as defined in claim 18 including a switch for turning off said driving motor, and a relay for operating said switch, said relay being operated in accordance with a signal from said computer.

* * * * *